US012055313B2

(12) United States Patent
Starr

(10) Patent No.: US 12,055,313 B2
(45) Date of Patent: Aug. 6, 2024

(54) HIGH-FLOW EMBER SHIELD BUILDING VENTILATOR

(71) Applicant: Noll/Norwesco LLC, Fife, WA (US)

(72) Inventor: David Starr, Vashon, WA (US)

(73) Assignee: NOLL/NORWESCO LLC, Fife, WA (US)

( * ) Notice: Subject to any disclaimer, the term of this patent is extended or adjusted under 35 U.S.C. 154(b) by 8 days.

(21) Appl. No.: 17/534,501

(22) Filed: Nov. 24, 2021

(65) Prior Publication Data

US 2022/0186975 A1 Jun. 16, 2022

Related U.S. Application Data

(60) Provisional application No. 63/125,190, filed on Dec. 14, 2020.

(51) Int. Cl.
*F24F 13/08* (2006.01)
*A62C 2/06* (2006.01)

(52) U.S. Cl.
CPC .............. *F24F 13/082* (2013.01); *A62C 2/06* (2013.01)

(58) Field of Classification Search
CPC .. F24F 13/082; F24F 7/02; A62C 2/06; A62C 3/14; F23J 13/08; F23L 17/02; E04B 1/94; B01D 39/10; B01D 39/12; B02D 46/521
See application file for complete search history.

(56) References Cited

U.S. PATENT DOCUMENTS

| | | | | | |
|---|---|---|---|---|---|
| 655,590 | A * | 8/1900 | Thomas | E06B 7/082 454/224 |
| 2,279,791 | A * | 4/1942 | Lamb | A62C 2/06 126/299 F |
| 2,490,220 | A * | 12/1949 | Leslie | E04D 13/03 454/366 |
| 6,056,809 | A * | 5/2000 | Chapman | B01D 46/0032 264/DIG. 48 |
| 7,128,643 | B2 * | 10/2006 | Beliveau | F24F 13/085 454/271 |
| 2011/0061318 | A1 * | 3/2011 | August | F24F 7/02 52/202 |
| 2012/0085051 | A1 * | 4/2012 | Perez | F24F 13/082 52/302.1 |
| 2016/0146499 | A1 * | 5/2016 | Sherry | F24F 13/085 454/367 |

FOREIGN PATENT DOCUMENTS

| | | | | |
|---|---|---|---|---|
| AU | 2014218350 A1 * | 8/2015 | | |
| DE | 202012102638 U1 * | 10/2012 | | B01D 39/12 |

* cited by examiner

*Primary Examiner* — Edelmira Bosques
*Assistant Examiner* — Michael James Giordano
(74) *Attorney, Agent, or Firm* — Lippes Mathias LLP

(57) ABSTRACT

A high-flow ember shield building ventilator with a substantially trapezoidal outer frame portion with a long side, a short side, a substantially vertical front side and opposing angled sides; and a folded metal insert. The long side has a first long side end and a second long side end, the short side has a first short side end and a second short side end, the substantially vertical front side has a first substantially vertical front side end and a second substantially vertical front side end, the angled side has a first angled side end and a second angled side end and the folded metal insert is between the first angled side end and the second angled side end.

15 Claims, 18 Drawing Sheets

SECTION A-A

HIGH-FLOW EMBER SHIELD BUILDING VENTILATOR

The present invention relates to building ventilator systems. This application claims priority to provisional patent application 63/125,190 filed Dec. 14, 2020, the entire contents of each are incorporated herein by reference.

Ventilation is required in most building structures to induce air flow across the under side of structure interior surfaces (typically floor and roof membranes) reducing potential for condensation, mold, or structure deterioration as well as cooling attic spaces, warming crawl spaces, improving isolation performance and overall interior space comfort. Net free area is the sum total area of openings allowing air to penetrate into the interior and a method of measuring effectiveness or specification for static ventilation.

Static ventilation works on principals of thermodynamics where delta air temperature inside space and outside create natural convection between intake and exhaust vents. When a structure is subjected to fire, the superheated air outside tends to supercharge the convection process forcing hot embers to flow into interior vented space leading to structure fires. The recent increased frequency and intensity of wildfires have caused building code requirements to evolve to block hot embers from being sucked into building structures through static vents. Typical specifications have reduced the maximum opening size of screen, or wire mesh openings to be ⅛" or less in any direction. This greatly reduces the net free area on most existing ventilation designs. While multiple additional ventilators can be installed to meet original NFA targets, a solution allowing original qty of vents maintaining net free area is desired.

The present invention addresses these problems by forming the screen into three dimensional shapes allows for significantly greater amount of screen to be installed in same original opening and allowing for total net free area of openings to be equal to original specifications while blocking passage to small airborne particles like glowing embers from a forest fire. Structure safety is increased by maintaining net free area and blocking smoldering embers.

BRIEF SUMMARY OF THE INVENTION

According to one aspect of the present invention, a high-flow ember shield building ventilator is provided comprising a substantially trapezoidal outer frame portion with a long side, a short side, a substantially vertical front side and opposing angled sides; wherein the long side has a first long side end and a second long side end, the short side has a first short side end and a second short side end, the substantially vertical front side has a first substantially vertical front side end and a second substantially vertical front side end and the angled side has a first angled side end and a second angled side end.

According to another aspect of the present invention, a high-flow ember shield building ventilator is provided with a substantially trapezoidal outer frame portion with a long side, a short side, a substantially vertical front side and opposing angled sides; and a folded metal insert. The long side has a first long side end and a second long side end, the short side has a first short side end and a second short side end, the substantially vertical front side has a first substantially vertical front side end and a second substantially vertical front side end, the angled side has a first angled side end and a second angled side end and the folded metal insert is between the first angled side end and the second angled side end.

DETAILED DESCRIPTION OF THE INVENTION

Figure 15:
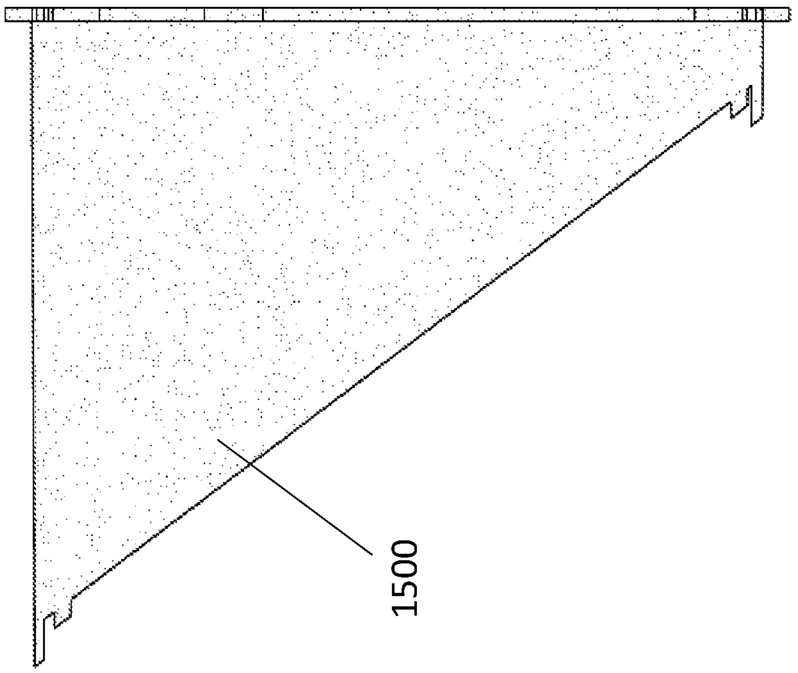
Figure 16:
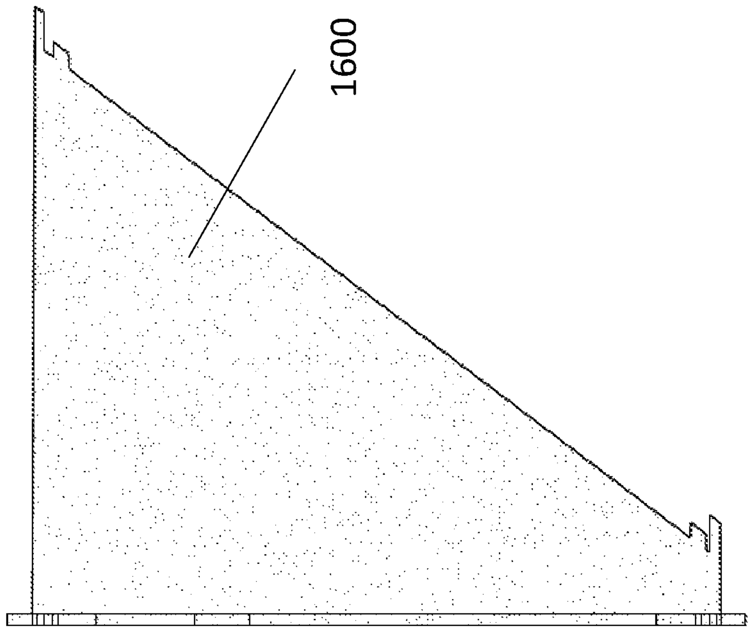
Figure 17:
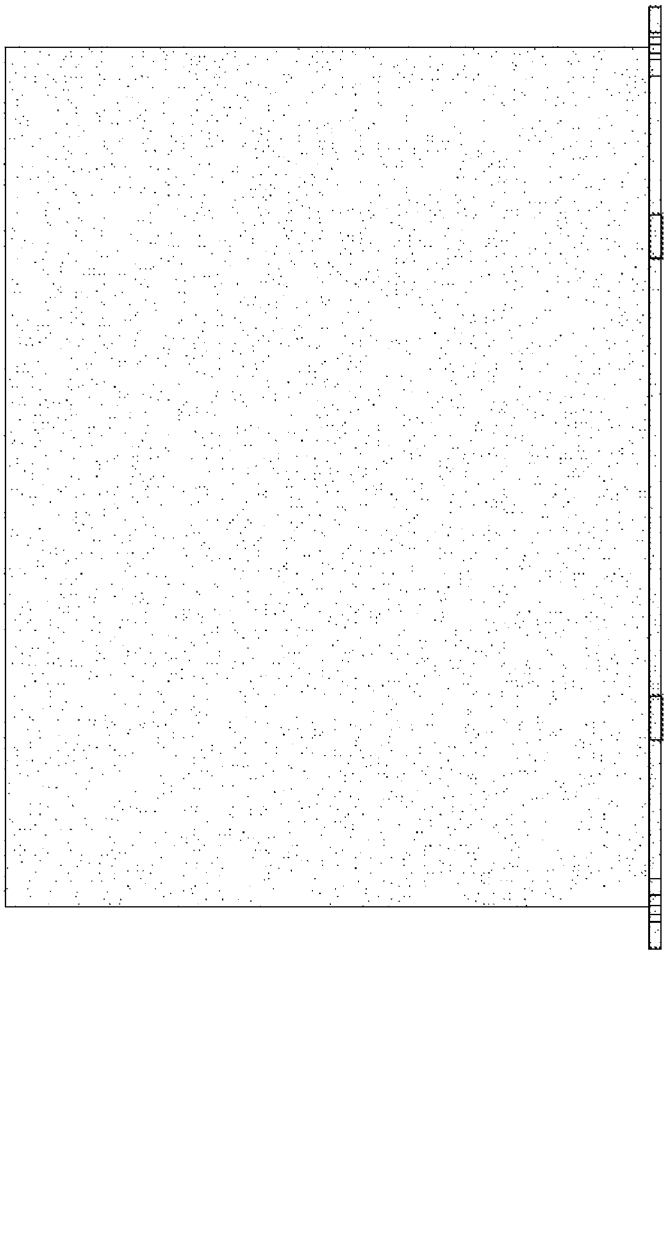
Figure 18:
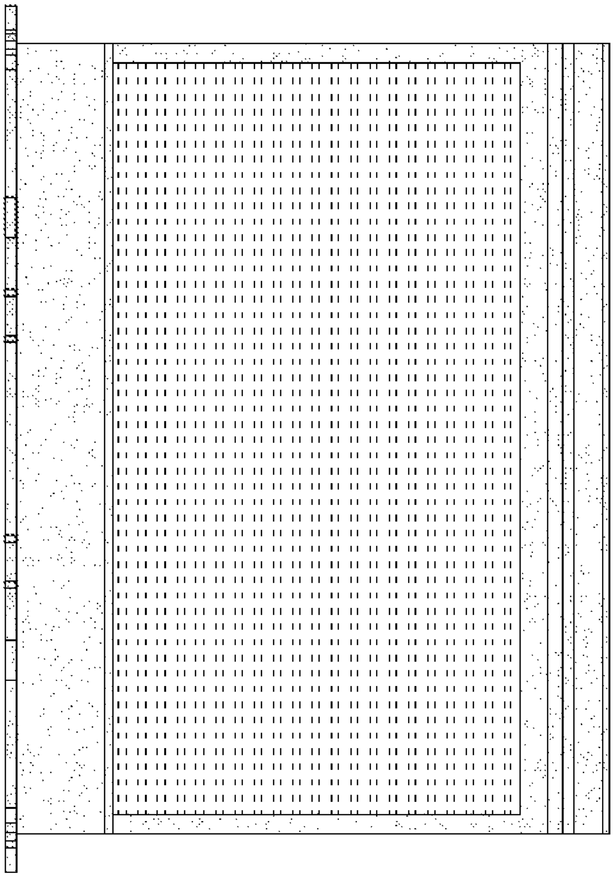

According to one aspect of the present invention, a high-flow ember shield building ventilator is provided. As shown in FIGS. 4, 5, 6, 7, 8, 9, 10, 11, 12, 13, 14, 15, 16, 17 and 18, there may be a high-flow ember shield building ventilator, comprising: a substantially trapezoidal outer frame portion (1100) with a long side (62), a short side (74), a substantially vertical front side (80) and opposing angled sides (1500 and 1600). The long side (62) has a first long side end (60) and a second long side end (64), the short side (74) has a first short side end (76) and a second short side end (72), the substantially vertical front side (80) has a first substantially vertical front side end (84) and a second substantially vertical front side end (78), the angled side (68) has a first angled side end (66) and a second angled side end (70). The second long side end (64) is in communication with the first angled side end (66), the second angled side end (70) is in communication with the second short side end (72), the first short side end (76) is in communication with the second substantially vertical front side end (78) and the first substantially vertical front side end (84) is in communication with the first long side end (60). It is noted that this forms one side of the opposing angled side as shown in FIG. 16. As would be appreciated by one of ordinary skill in the art, the opposing side as shown in FIG. 15 would be mirror image of FIG. 16 in order to form the three dimensional substantially trapezoidal outer frame portion (1100).

Figure 1:
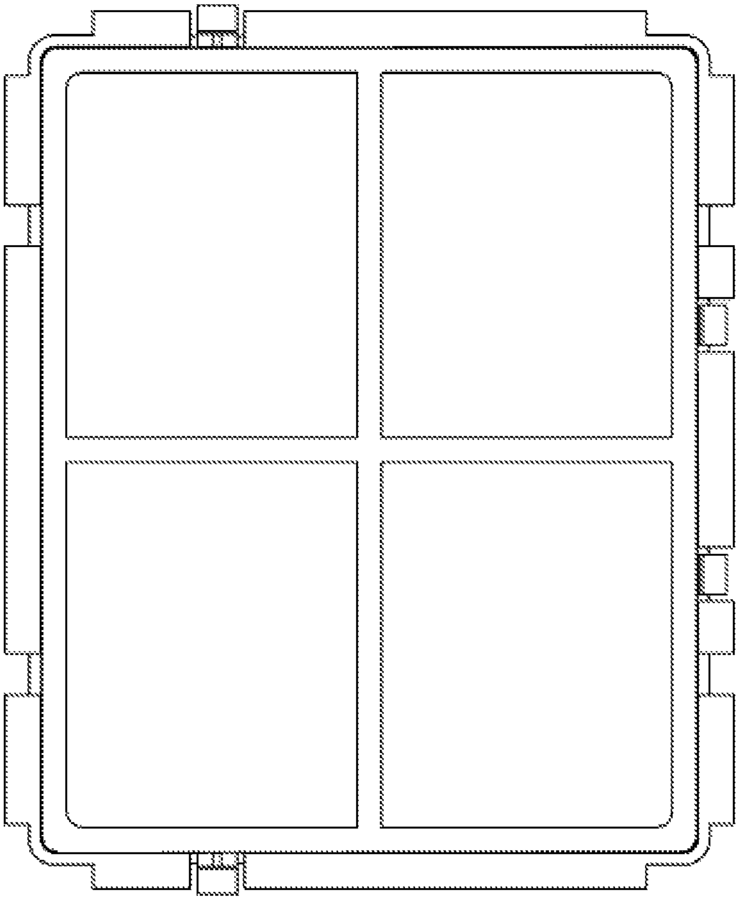
FIGURE 1 PRIOR ART
FIGS. 1, 2 and 3 depict a prior art square ember insert design.
Figure 2:
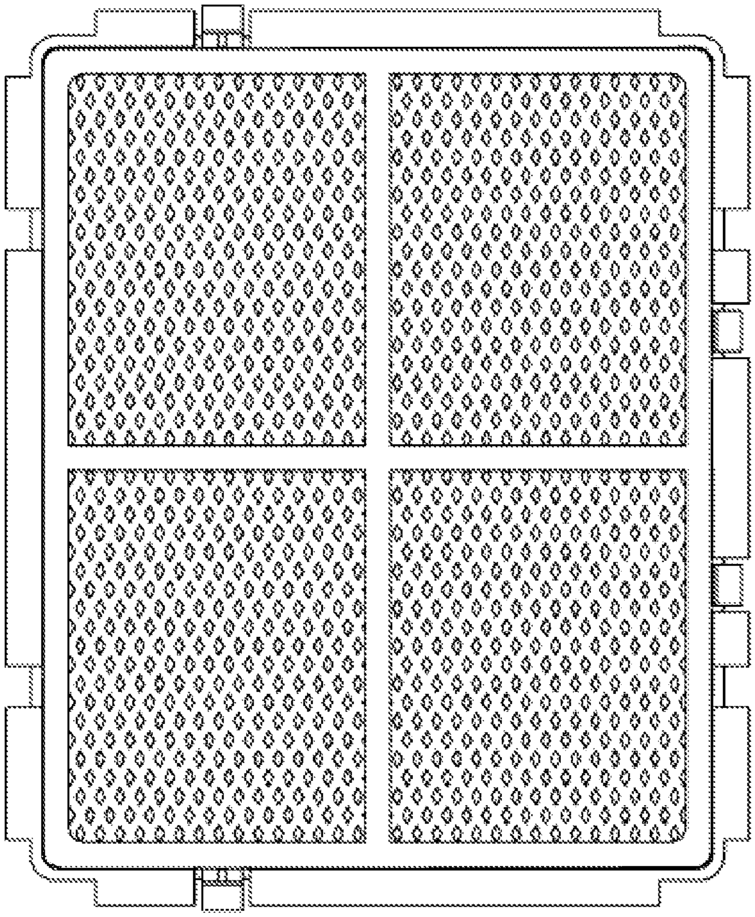
FIGURE 2 PRIOR ART
Figure 3:
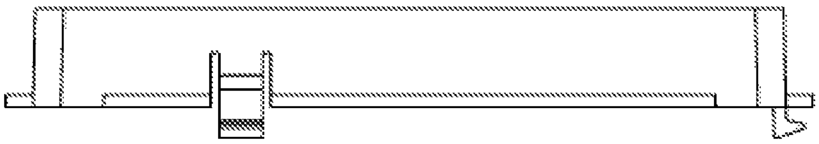
FIGURE 3 PRIOR ART
Figure 4:
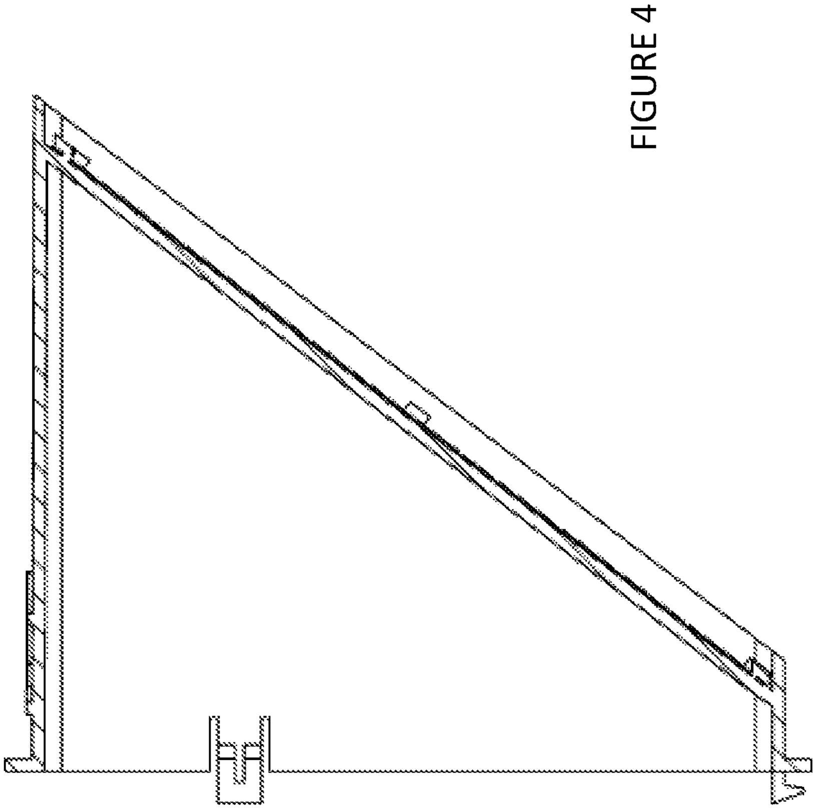
FIGS. 4, 5, 6, 7, 8, 9, 10, 11, 12, 13, 14, 15, 16, 17 and 18 depicts a high-flow ember shield building ventilator according to the present invention.
Figure 5:
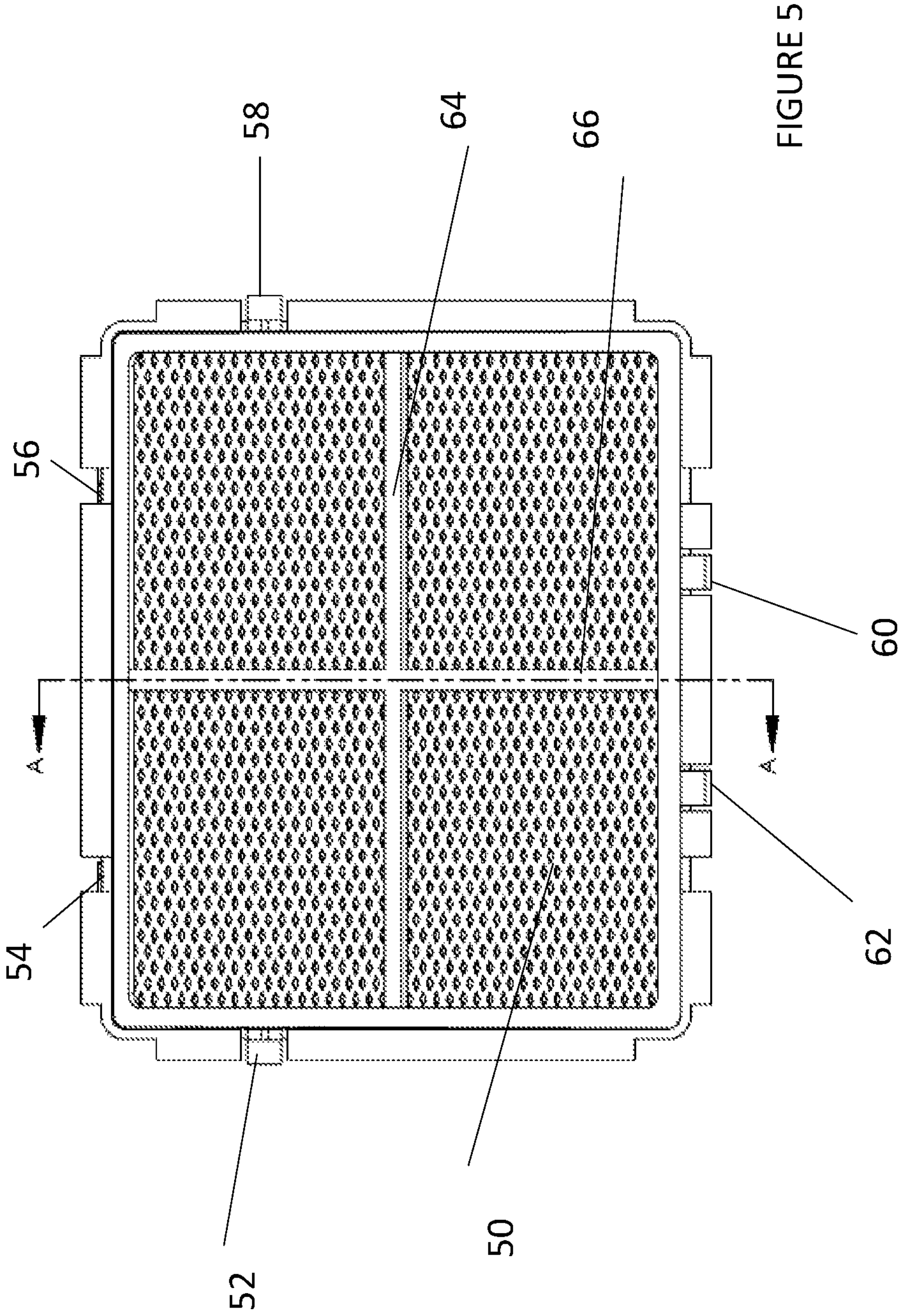
Figure 6:
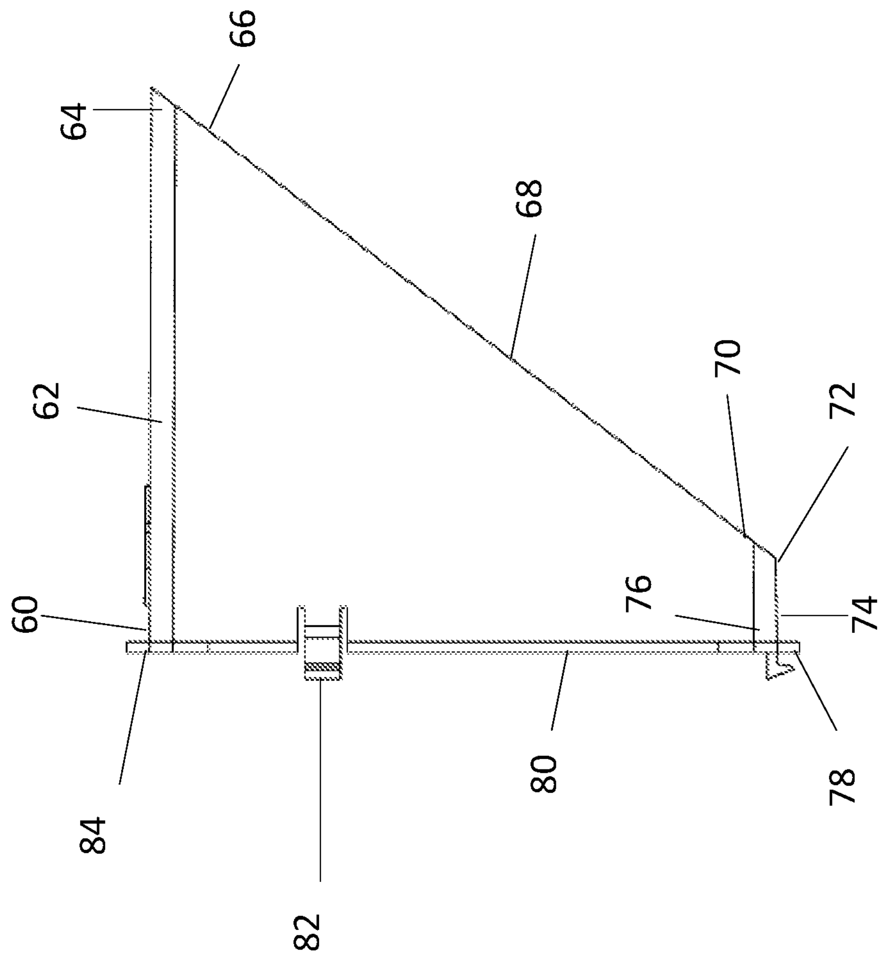
Figure 7:
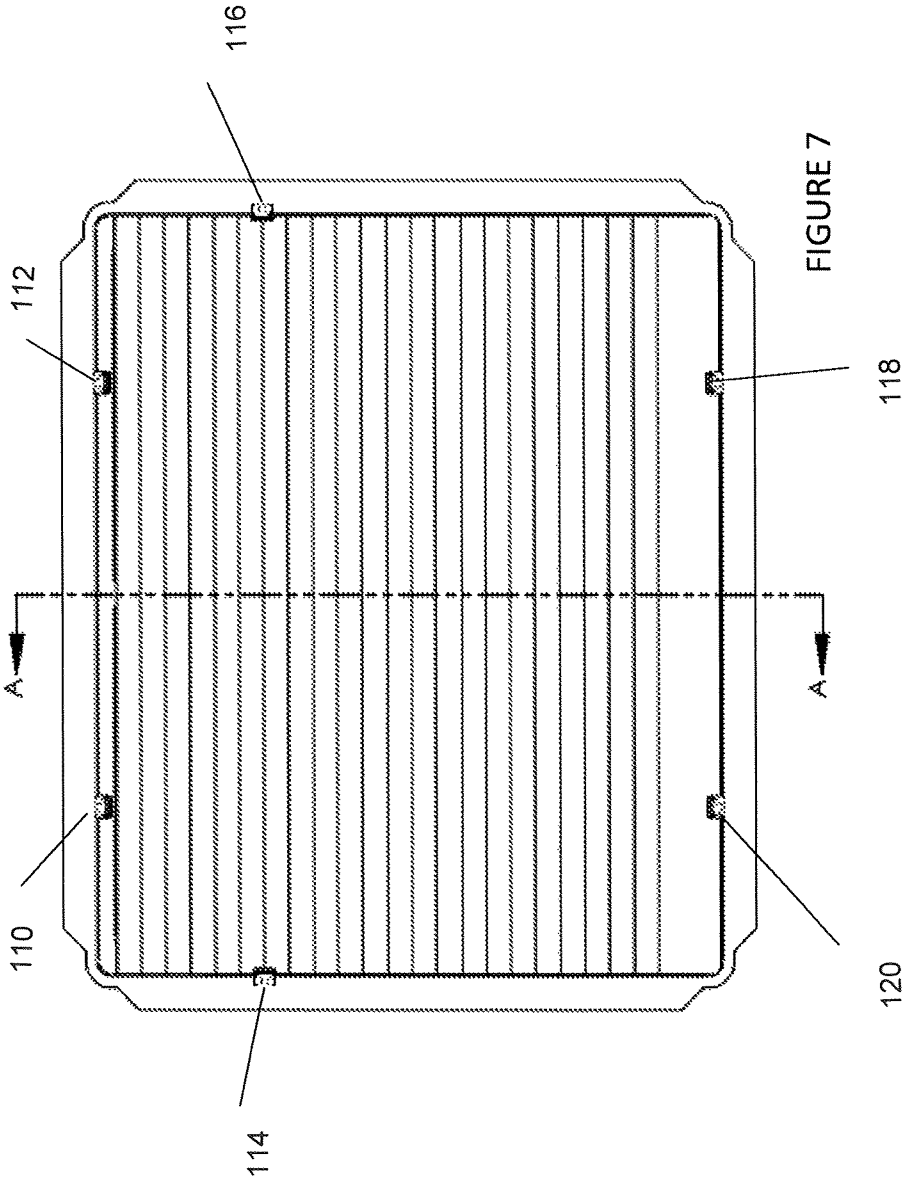
Figure 8:
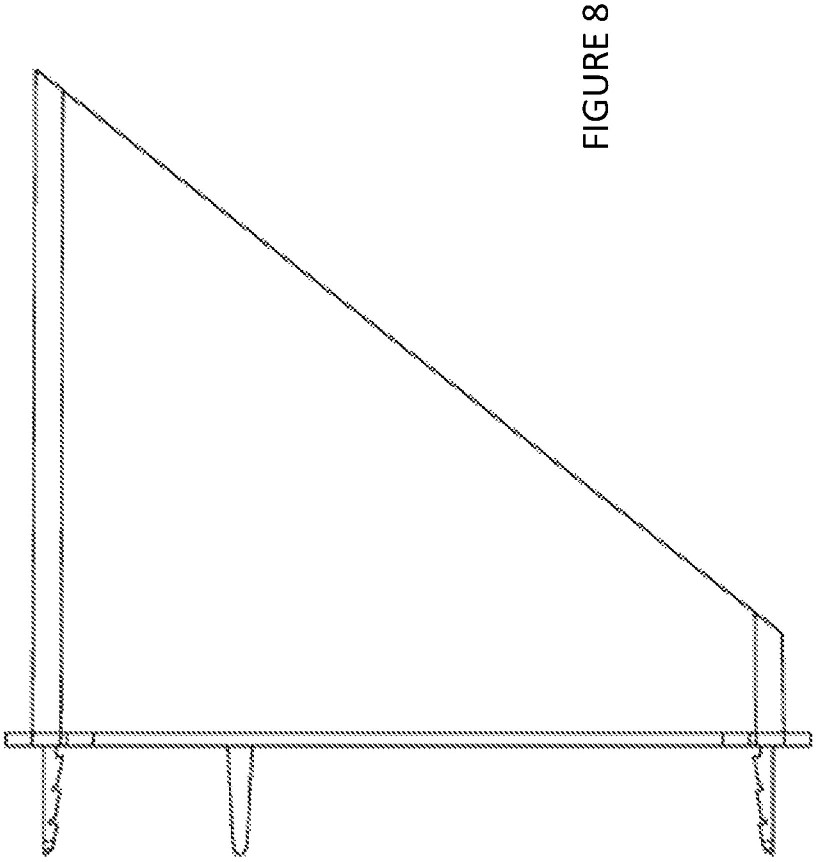
Figure 9:
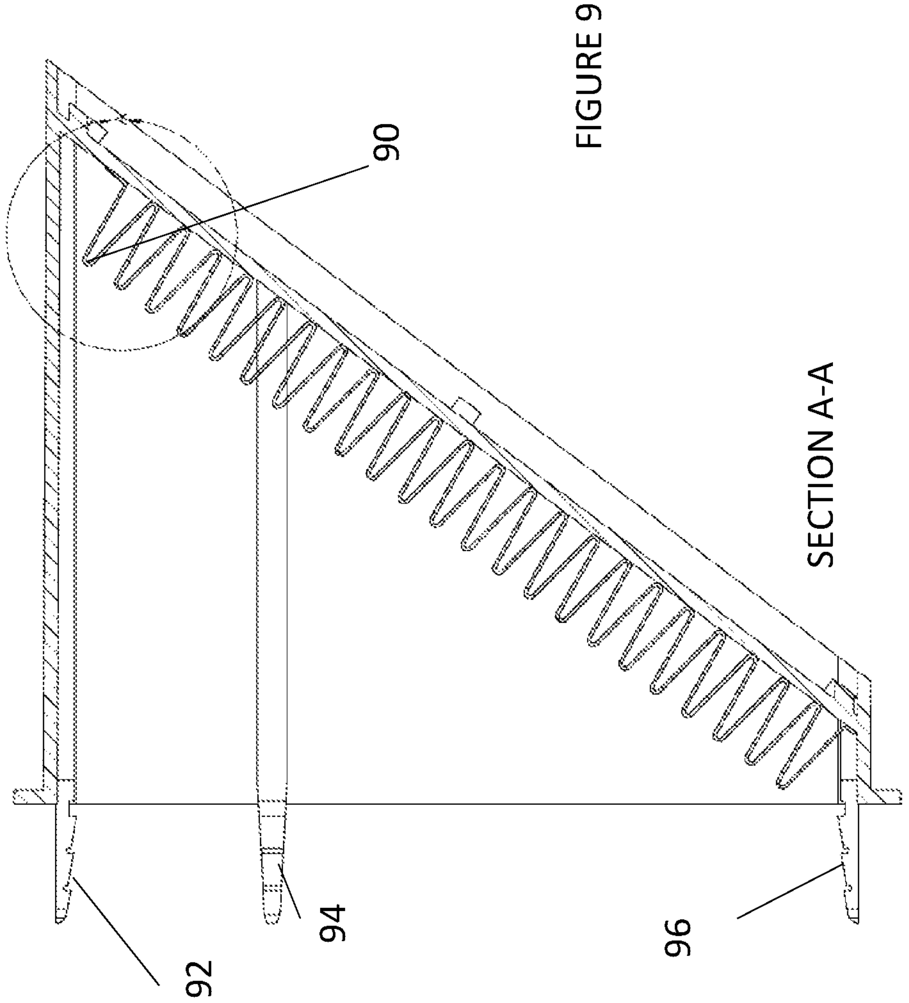
Figure 10:
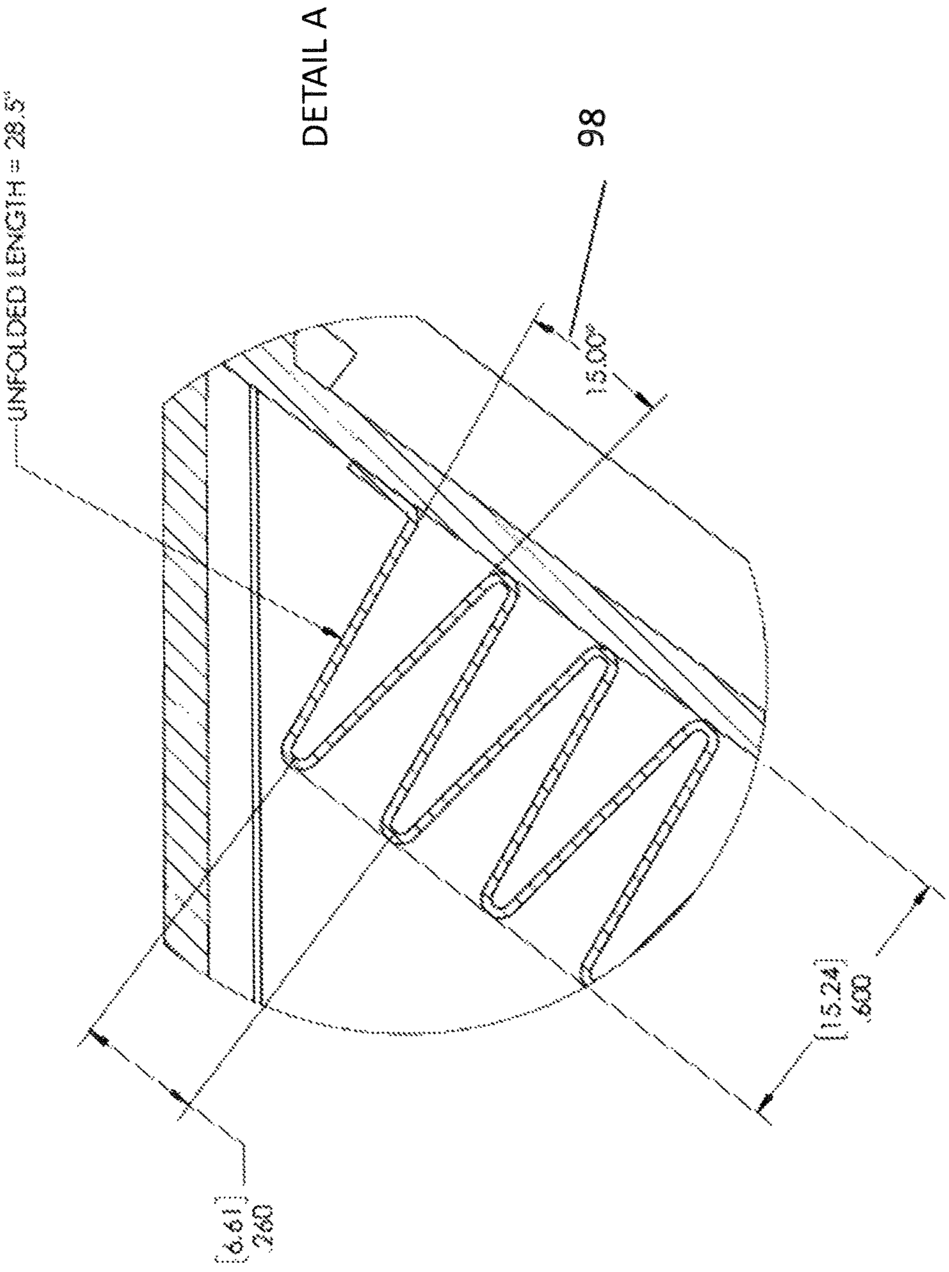
Figure 11:
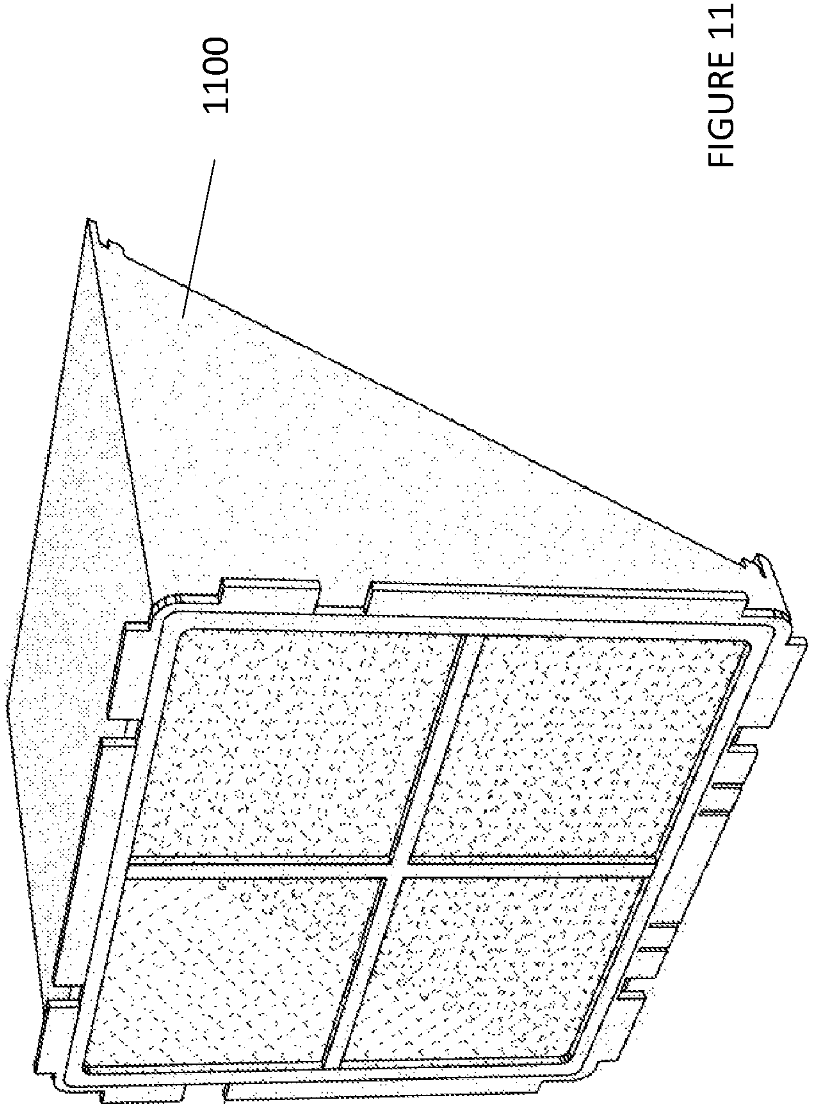
Figure 12:
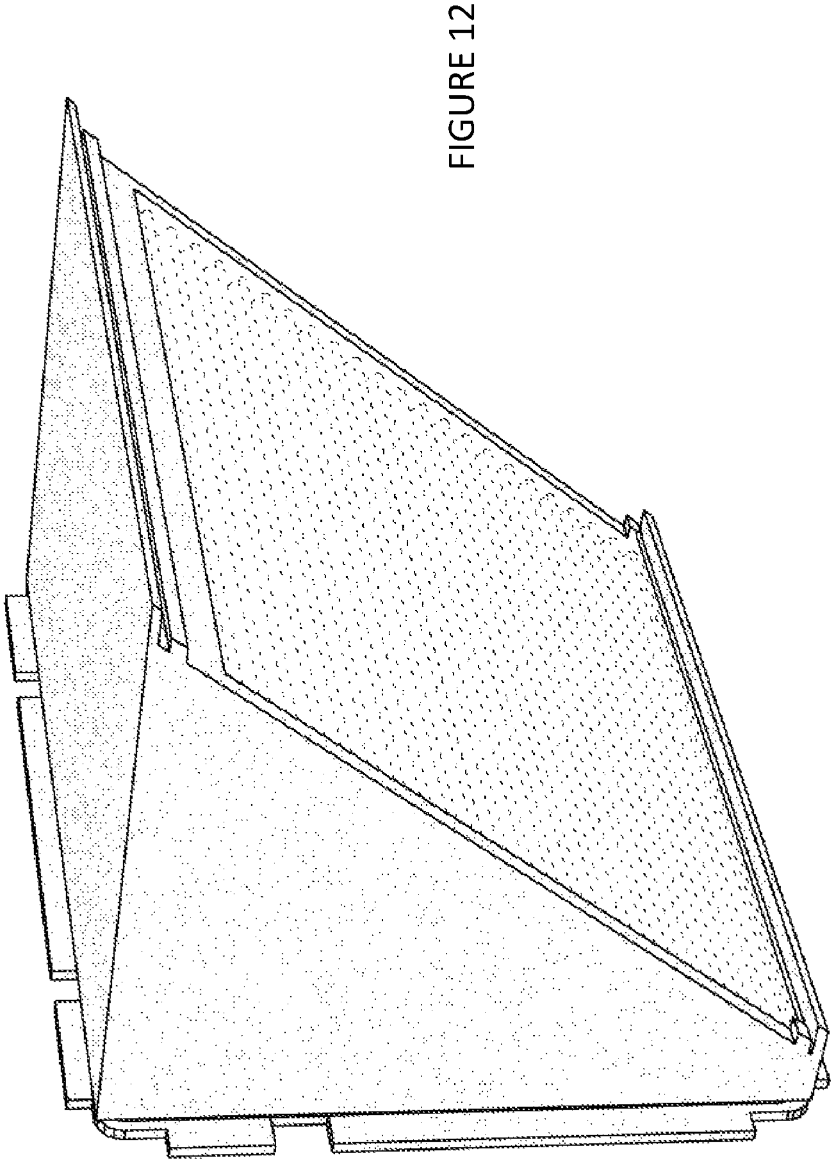
Figure 13:
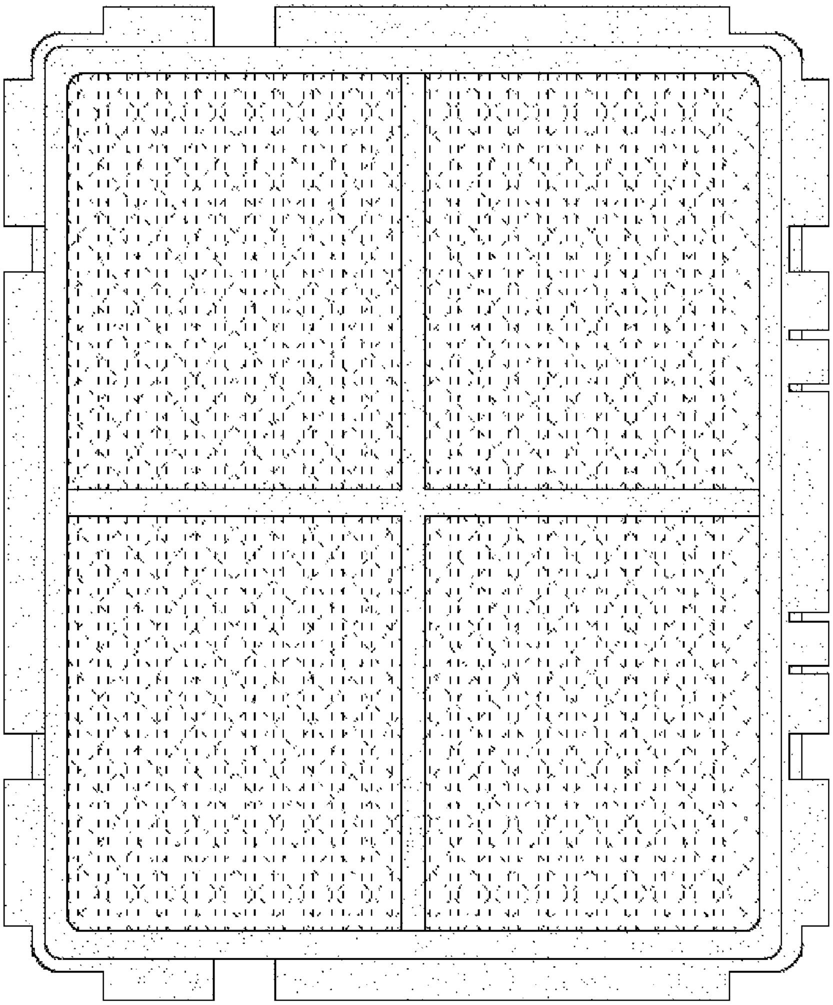
Figure 14:
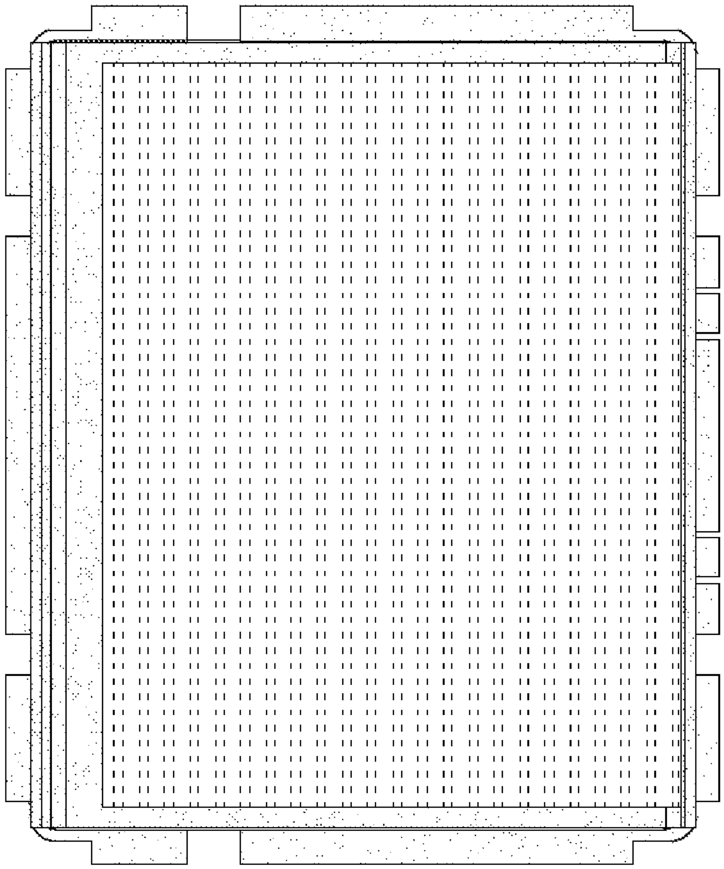

There may be at least one attachment clip (82, 52, 54, 56, 58, 60, 62)) for inserting the ventilator into a frame. The attachment clips may be on at least one of the long side (62), substantially vertical front (80) and short side (74). The substantially vertical front side has cross members (64, 66). The cross members may be perpendicular to form a plus shape (+). There may also be an expanded aluminum sheet (50) with openings retained behind the cross members (64, 66). The openings may be diamond shaped. This provides greater ventilation while protecting embers from entry. The openings are between 7 and 7.5 inches squared including the cross members, preferably substantially 7.30 inches squared including the cross members. As can been seen in comparing FIG. 5 to prior art FIG. 2, there are a greater number of smaller openings. This provides superior blocking passage to small airborne particles like glowing embers from a forest fire. In addition to its usefulness in preventing entry of hot embers, the invention also has application in enhancing the performance of attic, roof and wall cavity ventilation systems, allowing greater air flow for dissipating excess heat and for drying and moisture elimination than current profiles now in use, whether such systems use static or powered ventilation.

There may be a folded metal insert (90) between the first angled side end (66) and the second angled side end (70). The folded metal insert may be a metal screen. A screen or mesh also prevents intrusion of insects or rodents. The folded metal insert may have folds at a substantially 15 degree angle (92). There may also be at least one vertical support (e.g. 92, 94, 96). According to one embodiment, there are two vertical supports (110, 112) in communication with the long side, two vertical supports (114, 116) in communication with each of the opposing angled sides and two vertical supports (118, 120) in communication with the short side.

It should be understood that the foregoing relates to preferred embodiments of the invention and that modifications may be made without departing from the spirit and scope of the invention as set forth in the following claims.

I claim:

1. A high-flow ember shield building ventilator, comprising:
- a three dimensional substantially trapezoidal outer frame portion with a long side, a short side, a substantially vertical front side and opposing angled sides;
- wherein the long side has a first long side end and a second long side end,
- wherein the short side has a first short side end and a second short side end,
- wherein the substantially vertical front side has a first substantially vertical front side end and a second substantially vertical front side end,
- wherein the angled side has a first angled side end and a second angled side end; wherein a folded insert is positioned between said first angled side end and said second angled side end; said folded insert comprises a plurality of folds at an optimized angle wherein said folded insert extends along said angled side and is positioned at an angle with respect to said substantially vertical front side end; and
- wherein said substantially vertical front side has cross members, and an expanded aluminum sheet with substantially diamond shaped openings retained behind the cross members;
- wherein said substantially diamond shaped openings are configured to permit air flow and block passage of small particles including ember; and including a vertical support.

2. A high-flow ember shield building ventilator as in claim 1, further comprising at least one attachment clip for inserting the ventilator into a frame.

3. A high-flow ember shield building ventilator as in claim 2, wherein the attachment clip is on at least one of the long side, substantially vertical front and short side.

4. A high-flow ember shield building ventilator as in claim 1,
- wherein the overall dimension of said ventilator including openings and cross members is between 7 inches squared and 7.5 inches squared.

5. A high-flow ember shield building ventilator as in claim 1,
- wherein the folded metal insert is a metal screen or mesh.

6. A high-flow ember shield building ventilator as in claim 1,
- wherein the folded metal insert has folds at a substantially 15 degree angle.

7. A high-flow ember shield as in claim 1, wherein said at least one vertical support comprises two vertical supports in communication with the long side, two vertical supports in communication with each of the opposing angled sides and two vertical supports in communication with the short side.

8. A high-flow ember shield building ventilator, comprising:
- a three dimensional substantially trapezoidal outer frame portion with a long side, a short side, a substantially vertical front side and opposing angled sides; and
- a folded metal insert;
- wherein a sheet with openings is retained behind said substantially vertical front side, wherein said sheet comprises an expanded aluminum sheet with openings behind cross members formed on said substantially vertical front side,
- wherein the long side has a first long side end and a second long side end,
- wherein the short side has a first short side end and a second short side end,
- wherein the substantially vertical front side has a first substantially vertical front side end and a second substantially vertical front side end,
- wherein the angled side has a first angled side end and a second angled side end,
- wherein the folded metal insert is positioned along the angled side between the first angled side end and the second angled side end wherein said folded insert extends along said angled side and is positioned at an angle with respect to said substantially vertical front side; and
- wherein said ventilator comprises at least one vertical support.

9. A high-flow ember shield building ventilator as in claim 8, further comprising at least one attachment clip for inserting the ventilator into a frame.

10. A high-flow ember shield building ventilator as in claim 9, wherein the attachment clip is on at least one of the long side, substantially vertical front and short side.

11. A high-flow ember shield building ventilator as in claim 8, wherein the openings are diamond shaped.

12. A high-flow ember shield building ventilator as in claim 8, wherein said ventilator has an overall dimension between 7 and 7.5 inches squared.

13. A high-flow ember shield building ventilator as in claim 8, wherein the folded metal insert is a metal screen or mesh.

14. A high-flow ember shield building ventilator as in claim 8, wherein the folded metal insert has folds at a substantially 15 degree angle.

15. A high-flow ember shield as in claim 8, wherein said at least one vertical support comprises two vertical supports in communication with the long side, two vertical supports in communication with each of the opposing angled sides and two vertical supports in communication with the short side.

* * * * *